June 14, 1949.                E. P. WHITLOW                2,473,385
           ABSORPTION REFRIGERATION METHOD AND SYSTEM HAVING
Filed Jan. 13, 1948      PROVISION FOR THE RETURN OF PURGED GAS
                                                    2 Sheets-Sheet 2

INVENTOR.
Eugene P. Whitlow
BY
J. L. Kelly
ATTORNEY

Patented June 14, 1949

2,473,385

UNITED STATES PATENT OFFICE 2,473,385

ABSORPTION REFRIGERATION METHOD AND SYSTEM HAVING PROVISION FOR THE RETURN OF PURGED GAS

Eugene P. Whitlow, Evansville, Ind., assignor to Servel, Inc., New York, N. Y., a corporation of Delaware Application January 13, 1948, Serial No. 2,095

17 Claims. (Cl. 62—119)

1

This invention relates to refrigeration and particularly to absorption refrigerating systems of the two-pressure type.

In absorption refrigerating systems of the two-pressure type, for example those which operate at low pressures, non-condensable gases often collect in certain parts of such systems and unless these gases are removed the efficiency of the system is reduced. Various devices have been proposed for removing non-condensable gases from refrigerating systems, which devices, generally speaking, strip the system of all non-condensable gases. However, it has been found in practice with refrigerating systems of the above type that superheating of the refrigerant-absorbent solution in the generator or vapor expeller may be reduced to a negligible degree by retaining a small amount of non-condensable gas in the system. Non-condensable gases form vapor nuclei in the generator, whereby the refrigerant-absorbent solution therein boils more readily and superheat and its ensuing noise is reduced.

It is therefore an object of this invention to provide an improved method of, and apparatus for, retaining a small but definite amount of non-condensable gas in a refrigerating system of the above type, and for exhausting to the atmosphere any excess of non-condensable gases that accumulate in the system beyond the definite amount that it is desired to retain therein.

Figure 1:
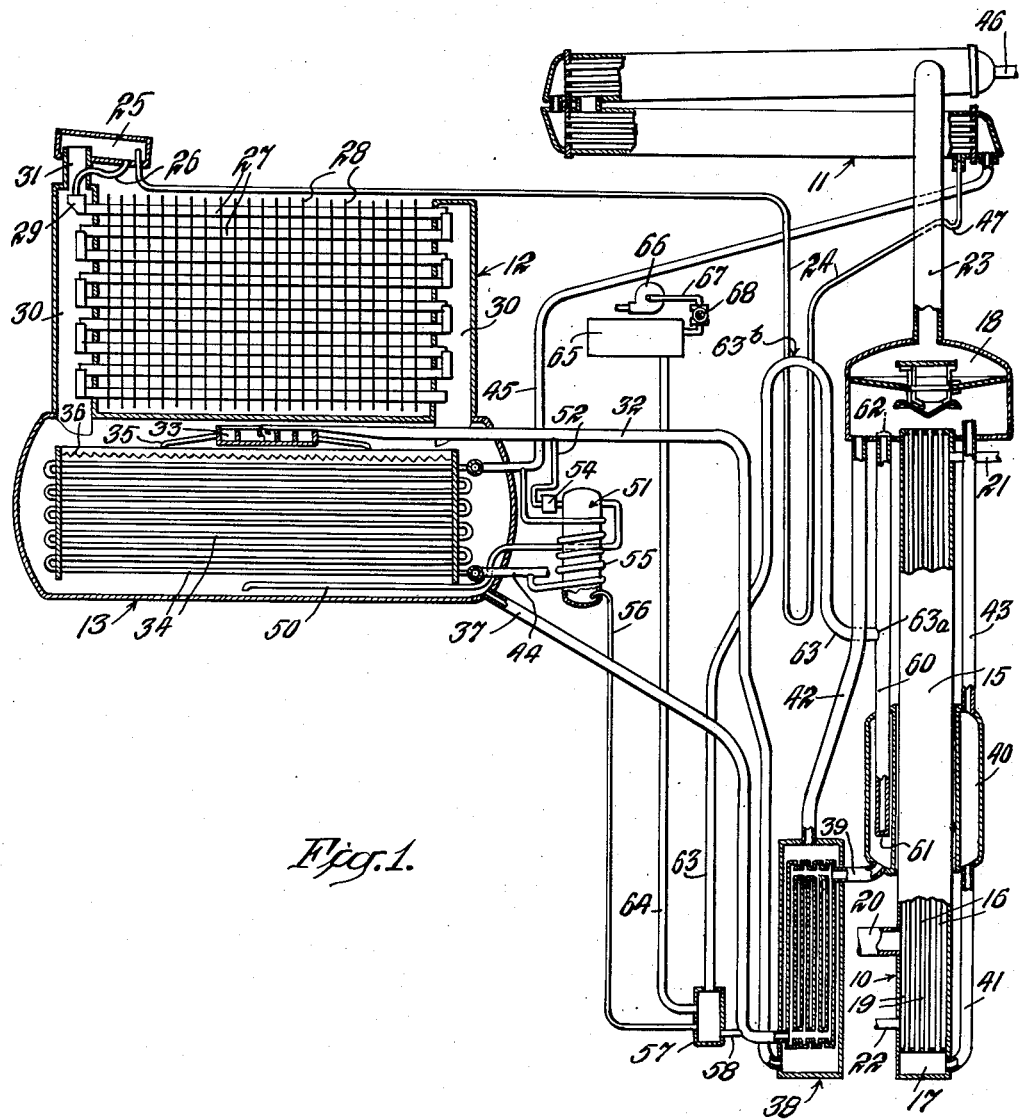
Figure 2:
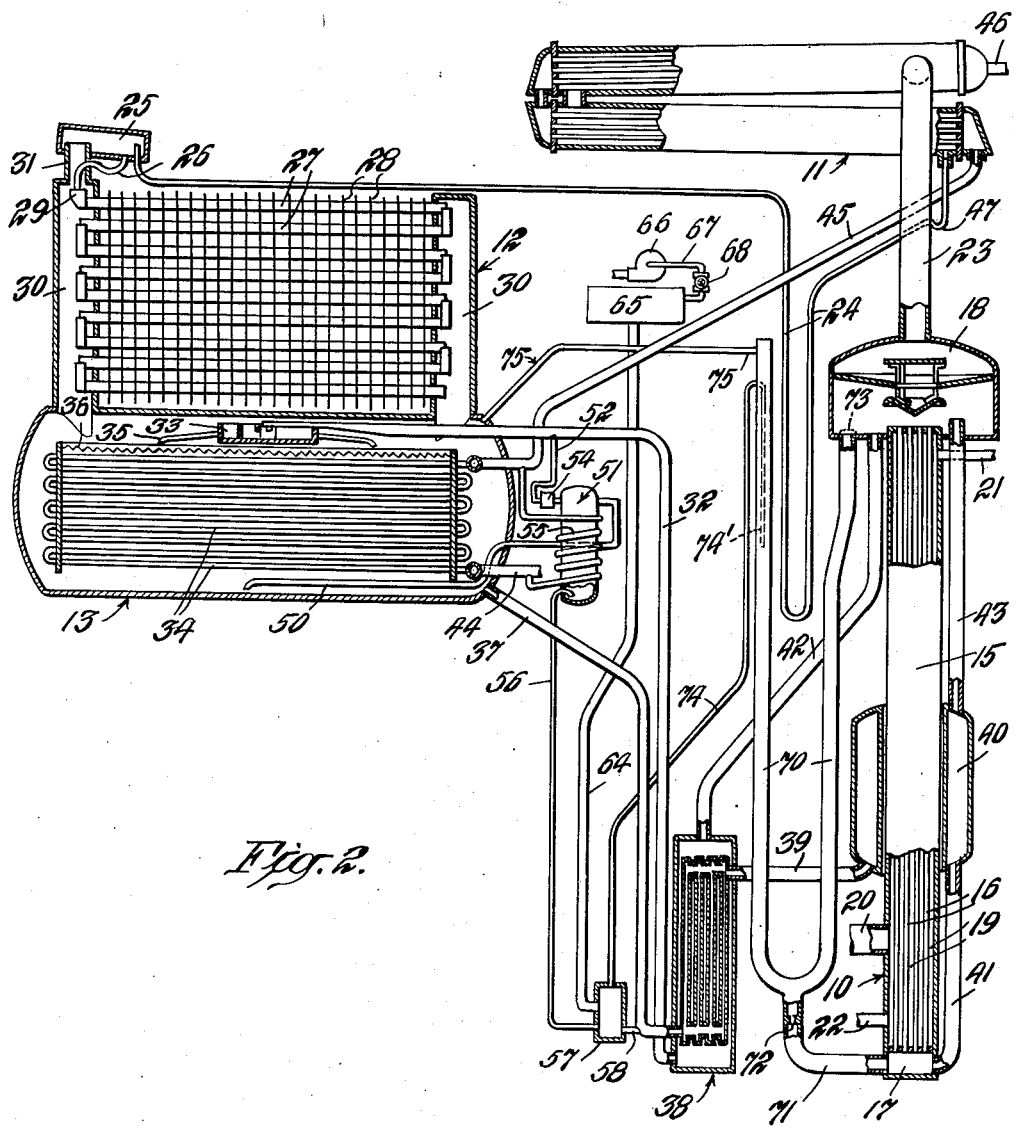

The invention together with its objects and advantages will be more clearly understood from the following detailed description taken in connection with the accompanying drawing, in which:

Fig. 1 is a view diagrammatically illustrating a refrigerating system incorporating one embodiment of my invention; and Fig. 2 is a view, similar to Fig. 1, illustrating a second embodiment of my invention.

For purposes of illustration, I have incorporated my invention in a two-pressure absorption refrigerating system like that disclosed in United States Patent to A. R. Thomas No. 2,384,860 granted September 18, 1945. A system of this type operates at low pressures and includes a generator or vapor expeller 10, a condenser 11, an evaporator 12 and a main absorber 13 which are interconnected in such a manner that flow of fluids between the high and low pressure sides of the system is regulated by liquid columns. The disclosure in the aforementioned Thomas patent may be considered as being incorporated in this application, and, if desired, reference may be made

2 thereto for a detailed description of the refrigerating system.

Except for the two specific gas retaining means illustrated in Figs. 1 and 2, the refrigerating systems illustrated in these two figures are identical, therefore like reference characters are used to indicate like parts in these figures.

The generator 10 includes an outer shell 15 within which are disposed a plurality of vertical riser tubes 16 having the lower ends thereof connected to receive liquid from an inlet chamber 17 and the upper ends extending into and above the bottom of a separating vessel 18. A space 19 within shell 15 forms a chamber to which steam is supplied through a conduit 20 from a suitable source of supply, so that full length heating of the tubes 16 is effected. A vent 21 is provided at the upper end of shell 15, and a conduit 22 is connected to the bottom part of the shell for draining condensate from the space 19.

The system operates at a partial vacuum and contains, for example, a saline refrigerant-absorbent solution, in which water is the refrigerant and lithium chloride, lithium bromide or a mixture of the two is the absorbent. When steam is supplied through conduit 20 to space 19 at atmospheric pressure, heat is supplied to tubes 16 for expelling refrigerant vapor from solution. The residue absorption liquid is raised through tubes 16 by gas or vapor-lift action. The refrigerant vapor discharged from the upper ends of the tubes or risers 16 separates from the raised absorption liquid in the vessel 18 and flows through a conduit 23 into condenser 11 wherein the vapor is condensed. The liquid refrigerant formed in the condenser flows through a U-tube 24 into a flash chamber 25 and from the latter through a tube 26 into the evaporator 12.

The evaporator includes a plurality of horizontal banks of tubes 27 disposed one above the other and having heat transfer fins 28 secured thereto to provide a relatively large heat transfer surface. The liquid refrigerant flowing to the evaporator is divided in any suitable manner for flow through the uppermost bank of tubes 27. For example, the dividing of liquid may be effected by a liquid distributing trough 29 into which the liquid flows from the tube 26. The liquid refrigerant flows in successively lower tubes through suitable end connections which are open to permit escape of vapor from the tubes.

The liquid refrigerant supplied to tubes 27 evaporates therein to produce a refrigerating or cooling effect with consequent absorbtion of heat from the surroundings, as from a stream of air flowing over the exterior surfaces of the tubes 27 and fins 28. The vapor formed in tubes 27 passes out into end headers 30 which are connected at their lower ends to the absorber 13. Any vapor formed in flash chamber 25 passes through a conduit 31 into one of the headers 30 and mixes with vapor formed in the evaporator 12, so that disturbances in the evaporator due to vapor flashing of incoming liquid are avoided.

In absorber 13 refrigerant vapor is absorbed into absorption liquid entering through a conduit 32. The entering absorption liquid flows into a vessel 33 in which liquid is distributed laterally with respect to a plurality of vertically disposed pipe banks 34 arranged alongside of each other. The liquid flows from vessel 33 through conduits 35 into a plurality of liquid holders and distributors 36 which extend lengthwise of and above the uppermost branches of the pipe banks 34. Absorption liquid is siphoned over the walls of the liquid holders 36 onto the uppermost pipe sections. Absorption liquid drips or trickles from each horizontal pipe section onto the next lower pipe section, so that all of the pipe sections are wetted with a film of liquid. Absorption liquid enriched in refrigerant flows from absorber 13 through a conduit 37, an inner group of passages in a liquid heat exchanger 38, a conduit 39, a stabilizing or leveling vessel 40, and a conduit 41 into the inlet chamber 17 of the generator. Refrigerant vapor is expelled from solution in the generator by heating, and the residue absorption liquid is raised by gas or vapor-lift action in riser tubes 16, as explained above.

The absorption liquid in vessel 18, from which refrigerant has been expelled, flows through a conduit 42, an outer group of passages in liquid heat exchanger 38, and conduit 32 into the upper part of absorber 13. This circulation of absorption liquid is effected by raising the liquid in the vertical riser tubes 16 by vapor-lift action, so that liquid can flow from the generator to the absorber and return from the latter to the generator by force of gravity.

The upper part of vessel 40 is connected by a conduit 43 to vessel 18, so that the pressure in vessel 40 is equalized with the pressure in the upper part of the generator and in the condenser. Vessel 40 is of sufficient volume to hold the liquid differential in the system and is of sufficient cross-sectional area that the liquid level therein does not vary appreciably, so that a substantially constant reaction head is provided for lifting absorption liquid in the riser tubes of the generator.

The heat liberated with absorption of refrigerant vapor in absorber 13 is transferred to a cooling medium, such as water, which flows upward through the vertically disposed pipe banks 34. The cooling water enters the lower end of the pipe banks through a conduit 44 and leaves the upper end of the pipe banks through a conduit 45. Conduit 45 is connected to the condenser so that the same cooling water is utilized to effect cooling of both condenser 11 and absorber 13. From the condenser the cooling water flows through a conduit 46 to waste, or to a cooling tower, not shown.

During operation of the refrigeration system, non-condensable gases may collect in both the high and low pressure sides of the system. The non-condensable gases collecting in the high-pressure side of the system, that is, the generator 10 and condenser 11, are carried to the dead or far end of the condenser in the bottom part thereof by the sweeping effect of the refrigerant vapor flowing into the condenser. Since the non-condensable gases are swept to the bottom part of the condenser, the U-tube 24 is effectively utilized to transfer such gases from the condenser to the evaporator by providing a trap 47 therein. Trap 47 traps non-condensable gas in the down leg of tube 24 between slugs of liquid refrigerant intermittently siphoned from the trap. Hence, the liquid refrigerant flowing through tube 24 to the evaporator carries with it the non-condensable gases collecting in the condenser and generator.

The non-condensable gases in the low-pressure side of the system, that is, in the evaporator 12 and absorber 13, are carried to the bottom center part of the absorber by the sweeping action of the refrigerant vapor entering the top of the absorber through headers 30. In order to localize the non-condensable gases in a relatively small space, such gases are withdrawn from the bottom part of absorber 13 through a conduit 50 to the top of an auxiliary absorber 51. A small portion of the absorption liquid flowing toward the upper part of absorber 13 in conduit 32 is diverted into a conduit 52. A screen, not shown, removes any foreign matter in the diverted liquid that may tend to clog a flow-restricting device 54, and the restricting device in turn limits the rate at which liquid is diverted into conduit 52 from the main stream of absorption liquid flowing in conduit 32. The auxiliary absorber is provided with horizontal plates, not shown, over which the diverted absorption liquid flows.

While the gases withdrawn from the main absorber 13 through conduit 50 into auxiliary absorber 51 are for the most part non-condensable, these gases are not sufficiently localized in the bottom of the main absorber 13 and tests have shown that refrigerant vapor accompanies the non-condensable gases withdrawn from the main absorber. For this reason the gases withdrawn from absorber 13 are brought into intimate contact with the diverted absorption liquid in the auxiliary absorber, whereby the refrigerant vapor accompanying the non-condensable gases is absorbed into the absorption liquid. The heat liberated with absorption of refrigerant vapor in the auxiliary absorber is transferred to a cooling medium flowing through a coil 55 connected between the inlet conduit 44 and outlet conduit 45 of the cooling system of the main absorber. The absorption liquid and gases both flow downwardly in intimate contact with each other in the auxiliary absorber and the gases arrive at the bottom part of the auxiliary absorber substantially stripped of refrigerant vapor.

The liquid flowing by gravity to the bottom part of the auxiliary absorber enters the upper end of a conduit 56 until the conduit is closed with liquid and sealed from the gases in the bottom part of the auxiliary absorber. When the liquid level rises sufficiently in the upper curved or bent portion of conduit 56, the small quantity of liquid within the open end is siphoned past the bend into the downwardly depending straight portion thereof. When liquid is siphoned from the upper curved end of conduit 56, the liquid level falls in the bottom part of the auxiliary absorber below the upper open end of conduit 56, so that non-condensable gases pass into the upper bend or curved part of this conduit. The liquid level in the bottom part of the auxiliary absorber again rises to close and seal the upper end of conduit 56, and, when the liquid level again rises sufficiently, a small quantity of liquid is once more siphoned into the downwardly depending straight portion of conduit 56. In this way small quantities of non-condensable gases are withdrawn from the bottom part of auxiliary absorber 51 and trapped between successive slugs of liquid formed at the upper curved or bent portion of the conduit 56. Conduit 56, which may be referred to as a fall tube pump, is of such size that flow of liquid is not appreciably restricted, however, the internal diameter is such that gas and liquid cannot pass each other while flowing downwardly through this conduit.

Referring now to Fig. 1 of the drawing, wherein one embodiment of my invention is illustrated, purge pump 56 delivers absorption liquid and non-condensable gas into a gas trap 57. The absorption liquid flows from this trap through a conduit 58 to conduit 37, which latter conduit conveys absorption liquid from absorber 13 to the heat exchanger 38 en route to the generator, or conduit 58 may be connected directly to the inlet chamber 17 of the generator. A conduit 60, provided with a metering orifice 61 in the lower end thereof, is connected between the vapor separator 18 and the leveling chamber 40. A screen 62 may be provided at the upper portion of conduit 60 so as to prevent the passage of foreign matter into this conduit. A conduit 63, provided with an inverted U-portion, connects conduit 60 at a point 63ª to the upper part of gas trap 57. A conduit 64 connects gas trap 57 to a purge receiver or reservoir 65. An evacuating pump 66 is connected to reservoir 65 by a conduit 67, which conduit is provided with a valve 68. The point 63ª at which conduit 63 enters conduit 60 must be far enough below the bottom of vapor separator 18 so that the liquid head in conduit 60, above this point of entry, will be great enough to trap the non-condensable gases in conduit 63 during "on periods" of operation of the refrigerating system. Also, the uppermost part, 63ᵇ, of conduit 63 must extend a sufficient distance above the bottom of vapor separator 18 to prevent siphoning of absorption liquid through conduit 63. The size of conduit 63 and of gas trap 57 are chosen so as to hold the optimum amount of non-condensable gases. The size of the orifice 61 is not critical, the only limitation being that it not be large enough to take a large enough fraction of the absorption liquid lifted into vapor separator 18 to interfere with the operation of the system but still be large enough to drain the conduit 60 in the normal "off period" of the system.

In the operation of the embodiment of my invention illustrated in Fig. 1, the bulk of the absorption liquid lifted in riser tubes 16 into the vapor separator 18 flows through conduit 42, heat exchanger 38 and conduit 32 into the main absorber, as explained above. Some of the absorption liquid which has been lifted into vapor separator 18 flows into conduit 60, and due to the metering orifice in the lower portion of this conduit, the conduit is filled with solution well above the point of entry, 63ª, of conduit 63 with conduit 60. Absorption liquid flows from conduit 60 into the upleg of conduit 63 providing a liquid trap in conduits 60 and 63 between the bottom of vapor separator 18 and the uppermost part, 63ᵇ, of conduit 63. The non-condensable gases that are conveyed to the gas trap 57 by purge pump 56 rise to the top of the gas trap and flow upward into conduit 63. The liquid trap between the uppermost part, 63ᵇ, of conduit 63 and the bottom of the vapor separator 18 prevents the flow of non-condensable gases from conduit 63 into conduit 60, so that non-condensable gases accumulate in the top of gas trap 57 and in conduit 63. When the amount of gas accumulated in conduit 63 and gas trap 57 is such that the level of liquid in gas trap 57 is depressed to the point at which conduit 64 opens into the gas trap, non-condensable gases pumped thereafter by purge pump 56 into the gas trap will flow therefrom through conduit 64 into purge receiver 65. Non-condensable gases may be exhausted from the purge receiver 65 from time to time by the evacuating pump 66.

When the unit is shut down, that is, on an "off period" when steam is no longer supplied to the space 19 of the generator and absorption liquid is no longer lifted through riser tubes 16 into the vapor separator 18, the absorption solution in conduit 60 will pass through orifice 61 into the leveling vessel 40. In this manner, the liquid level in conduits 60 and 63 is lowered to the point that gas will pass from gas trap 57 through conduit 63, into conduit 60, and upward therethrough into the vapor separator 18. When the unit is again started up, the non-condensable gases are picked up by the refrigerant vapor in vapor separator 18 and carried therefrom through conduit 23 into the condenser. From the condenser the non-condensable gases are conveyed through trap 47 and conduit 24 into the evaporator, and from the evaporator the non-condensable gases are conveyed to the main absorber 13, as explained above. In the main absorber, the non-condensable gases are brought into contact with absorption liquid trickling downward over the tubes 34 and some of the non-condensable gases are absorbed by the absorption liquid and carried therewith through conduit 37, liquid heat exchanger 38, conduit 39, leveling chamber 40 and conduit 41 into inlet chamber 17 of the generator. In the generator the non-condensable gases form vapor nuclei which reduce superheating and promote quiet boiling of the solution in the riser tubes 16.

Referring now to Fig. 2 of the drawing wherein a second embodiment of my invention is illustrated, the purge pump 56 delivers absorption liquid and non-condensable gases into gas trap 57, and the absorption liquid is conveyed from this trap through conduit 58 into conduit 37 that leads from the main absorber 13 to the liquid heat exchanger en route to the generator, the same as in Fig. 1. A conduit 70, in the form of a U-tube, leads from the lower portion of the vapor separator 18 and extends downwardly and then upwardly to an elevation an appreciable distance above the bottom of the vapor separator. A conduit 71, provided with a metering orifice 72, leads from the lower portion of U-tube 70 into inlet chamber 17 of the generator. A screen 73 is provided at the inlet of U-tube 70 so as to prevent the blocking of metering orifice 72 by foreign matter. A conduit 74 leads from the top of gas trap 57 and opens into the upper portion of the upleg of U-tube 70. As shown, conduit 74 has a downwardly bent portion 74' that projects downwardly into the upleg of the U-tube. A conduit 75 leads from the uppermost portion of U-tube 70 into the main absorber 13. A conduit 64 connects gas trap 57 with the purge receiver 65, as in Fig. 1. Also, an evacuating pump 66, connected to purge receiver 65 by conduit 67 provided with a valve 68, is used to exhaust non-condensable gases from purge receiver 65.

The lower end of extension 74' of conduit 74 must project downward in the upleg of U-tube 70 a sufficient distance that, during "on periods" of operation, a liquid column of sufficient height to block the flow of non-condensable gas through conduit 74 is maintained in the upleg of U-tube 70 above the lower end of extension 74'. Also, the uppermost portion of conduit 74 must be a sufficient distance above the bottom of the vapor separator 18 that siphoning of absorption liquid from the upleg of U-tube 70 is prevented. The point at which drain conduit 71 joins the bottom of U-tube 70 may be at any point below the lower end of extension 74' of conduit 74. In other words, the U-tube 70 need not be as deep as that shown in Fig. 2 of the drawing.

In the operation of the embodiment of my invention illustrated in Fig. 2, with absorption liquid lifted through riser tubes 16 into vapor separator 18, the bulk of this liquid flows through conduit 42, heat exchanger 38 and conduit 32 into the main absorber, as in Fig. 1. Absorption liquid also flows into the down leg of U-tube 70 forming a liquid trap in this tube. Liquid absorbent flows from U-tube 70 through metering orifice 72 and conduit 71 into the bottom of the generator. However, the flow of absorption liquid into the U-tube is faster than the flow from this tube, so that as long as the unit is in operation there is a liquid seal provided in U-tube 70. However, when the unit is shut down absorption liquid will flow from U-tube 70 through the metering orifice 72 and conduit 71 into the bottom of the generator, whereby the level of liquid in this tube will fall to a point that the bottom of the downwardly extending portion 74' of conduit 74 is uncovered and non-condensable gas flows from trap 57 through conduit 74, projection 74', the upleg of U-tube 70, and conduit 75 into the main absorber.

As in Fig. 1, the non-condensable gas that is returned to the main absorber is brought into contact with absorption liquid which trickles downward over the tubes 34, whereby some of the non-condensable gas is absorbed or entrained by the absorption liquid and carried therewith through conduit 37, heat exchanger 38, conduit 39, leveling chamber 40 and conduit 41 into the inlet chamber of the generator. Also as in Fig. 1, non-condensable gases that find their way into the main absorber beyond those picked up therein by absorption liquid and carried to the generator, are conveyed through conduit 50, auxiliary absorber 51 and purge pump 56 to the gas trap 57. The non-condensable gases rise in the gas trap 58 and flow upward into conduit 74. However, during "on periods" of operation, absorption liquid is maintained in the upleg of U-tube 70 to a level such that flow of non-condensable gas through the portion 74' of conduit 74 is blocked, whereby the gases accumulate in gas trap 57 and conduit 74 until the quantity of accumulated gases is such that the level of absorption liquid in the gas trap is depressed to the point of entry of conduit 64 into the gas trap, after which, any excess gas pumped by the purge pump 56 into gas trap 57 flows therefrom through conduit 64 into the purge receiver 65, from whence the excess gas may be evacuated from time to time by pump 66.

Each of the two refrigerating systems illustrated and described herein is generally referred to as a continuous absorption refrigerating system of the two-pressure type, in that, so long as the medium which is being cooled demands refrigeration, the system operates continuously. However, when the refrigeration demands on the system are satisfied the system shuts down until such time as the demand for refrigeration is renewed. In other words, the system operates on "on periods" when there is a demand for refrigeration, and on "off periods" when the demand for refrigeration is satisfied. Also, each of the particular refrigerating systems illustrated and described herein may be said to have two main circuits or paths of flow for working media, and three auxiliary or by-pass circuits for flow of working media. The two main circuits are identical in Figs. 1 and 2. A first main circuit includes the generator 10, vapor separator 18, conduit 23, condenser 11, U-tube 24, flash chamber 25, conduit 26, evaporator 12, absorber 13, conduit 37, the inner passage of liquid heat exchanger 38, conduit 39, stabilizing vessel 40, and conduit 41 back to the generator 10. A second main circuit includes the generator 10, vapor separator 18, conduit 42, the outer passage of liquid heat exchanger 38, conduit 32, absorber 13, conduit 37, the inner passage of gas heat exchanger 38, conduit 39, stabilizing vessel 40, and conduit 41 back to the generator 10.

The first auxiliary circuit of each of the two figures is identical and includes a generator 10, vapor separator 18, conduit 42, the outer passage of liquid heat exchanger 38, conduit 32, conduit 52, auxiliary absorber 51, purge pump 56, gas trap 57, conduit 58, conduit 37, the inner passage of liquid heat exchanger 38, conduit 39, stabilizing vessel 40, and conduit 41 back to the generator 10. The second auxiliary circuit of Fig. 1 includes the main absorber 13, conduit 50, auxiliary absorber 51, purge pump 56, gas trap 57, conduit 63, upper portion of conduit 60, vapor separator 18, conduit 23, condenser 11, U-tube 24, flash chamber 25, conduit 31, and evaporator 12 back to the main absorber. A third auxiliary circuit of Fig. 1 includes the generator 10, vapor separator 18, conduit 60, stabilizing vessel 40, and conduit 41 back to the generator. In Fig. 2 the second auxiliary circuit includes the main absorber 13, conduit 50, auxiliary absorber 51, purge pump 56, gas trap 57, conduit 74, extension 74', the upper portion of the upleg of U-tube 70, and conduit 75 back to the main absorber. A third auxiliary circuit in Fig. 3 includes the generator 10, vapor separator 18, U-tube 70, and conduit 71 back to the generator 10.

Having thus disclosed my invention, I wish it to be understood that I do not desire to be limited to the particular structures illustrated and described for obvious modifications thereof may occur to a person skilled in the art.

What is claimed is:

1. An absorption refrigerating system including a high and a low-pressure side, means for collecting non-condensable gas in the low-pressure side of the system, means for entraining at least a portion of the collected non-condensable gas into absorption solution in the low-pressure side of the system, means for withdrawing from the low-pressure side of the system any collected non-condensable gas beyond that entrained in the absorption solution, and a gas trap for storing the withdrawn non-condensable gas during on periods of operation of the system, said gas trap being provided with means forming a liquid seal for retaining the non-condensable gas therein during on periods of operation of the system, and means for draining said liquid seal during off periods of operation of the system.

2. An absorption refrigerating system as set forth in claim 1 wherein the means forming the liquid seal is connected to the high-pressure side of the system for flow of non-condensable gas thereto, whereby the non-condensable gas stored in the gas trap is delivered to the high-pressure side of the system during off periods of operation.

3. An absorption refrigerating system as set forth in claim 1 wherein the means forming the liquid seal is connected to the low-pressure side of the system for flow of non-condensable gas thereto, whereby the non-condensable gas stored in the gas trap is delivered to the low-pressure side of the system during off periods of operation.

4. An absorption refrigerating system having a high and a low-pressure side and including a generator, a vapor separator, a condenser, an evaporator, an absorber and conduits interconnecting said elements providing main and auxiliary circuits for flow of working media therethrough, means for accumulating non-condensable gas in a main working media circuit of said system, means for withdrawing at least a portion of the accumulated non-condensable gas from the main working media circuit, means for storing the withdrawn non-condensable gas out of the main working media circuit during on periods of operation of the system, means providing a liquid seal for retaining the withdrawn gas in storage during on periods of operation, and means for draining the liquid seal during off periods of operation, whereby the stored non-condensable gas is returned to a main working media circuit during off periods of operation of the system.

5. An absorption refrigerating system as set forth in claim 4 wherein the means forming the liquid seal is connected to the high-pressure side of the system for flow of non-condensable gas thereto, whereby during off periods of operation when the liquid seal is drained the stored non-condensable gas is delivered to the high-pressure side of the system.

6. An absorption refrigerating apparatus as set forth in claim 4 wherein the means forming the liquid seal is connected to the low-pressure side of the system for flow of non-condensable gas thereto, whereby during off periods of operation when the liquid seal is drained the stored non-condensable gas is delivered to the low-pressure side of the system.

7. An absorption refrigerating system as set forth in claim 4 wherein the means forming the liquid seal is connected to the vapor separator for flow of non-condensable gas thereto, whereby during off periods of operation when the liquid seal is drained the stored non-condensable gas is delivered to the vapor separator.

8. An absorption refrigerating apparatus as set forth in claim 4 wherein the means forming the liquid seal is connected to the absorber for flow of non-condensable gas thereto, whereby during off periods of operation when the liquid seal is drained the stored non-condensable gas is delivered to the absorber.

9. An absorption refrigerating system including a generator, a vapor separator, a condenser, an evaporator, an absorber, conduits interconnecting said elements for flow of a refrigerating medium and an absorption solution and a by-pass for flow of absorption solution from and to the generator, said by-pass including means for withdrawing non-condensable gas from the absorber during on periods of operation of the system, means for storing at least a portion of the withdrawn non-condensable gas, and means for delivering the stored non-condensable gas to the vapor separator during each off period of operation of the system.

10. An absorption refrigerating system including a generator, a condenser, an evaporator, an absorber, conduits interconnecting said elements for flow of a refrigerating medium and an absorption solution and a by-pass for flow of absorption solution from and to the generator, said by-pass including means for withdrawing non-condensable gas from the absorber during on periods of operation of the system, means for storing at least a portion of the withdrawn non-condensable gas, and means for returning the stored non-condensable gas to the absorber during each off period of operation of the system.

11. An absorption refrigerating system including a generator, a vapor separator, a condenser, an evaporator, an absorber and conduits interconnecting said elements for flow of a refrigerating medium and an absorption solution, and means for retaining a predetermined amount of non-condensable gas in said system and for exhausting from the system any non-condensable gas beyond the predetermined amount retained therein, said last-named means including a gas trap, a fall tube connected between said absorber and a lower portion of said gas trap, a purge reservoir located above and connected to an intermediate portion of said gas trap, a conduit connected between the top of said gas trap and said vapor separator for flow of non-condensable gas therethrough and means for blocking the flow of non-condensable gas through said last-named conduit during on periods of operation of the system and for opening said conduit to flow of non-condensable gas therethrough during off periods of operation, the construction and arrangement being such that during on periods of operation of the system non-condensable gas is withdrawn from the absorber of said system and delivered to said gas trap until a predetermined amount of such gas is accumulated in said trap, after which, any non-condensable gas delivered to said trap beyond the predetermined amount is conveyed therefrom to said purge receiver, and during off periods of operation of said refrigerating system the predetermined amount of non-condensable gas retained in said gas trap is delivered to the vapor separator of said system.

12. An absorption refrigerating system including a generator, a condenser, an evaporator, an absorber and conduits interconnecting said elements for flow of a refrigerating medium and an absorption solution, and means for retaining a predetermined amount of non-condensable gas in said system and for exhausting from the system any non-condensable gas beyond the predetermined amount retained therein, said last-named means including a gas trap, a fall tube connected between said absorber and a lower portion of said gas trap, a purge reservoir located above and connected to an intermediate portion of said gas trap, a conduit connected between the top of said gas trap and said absorber for flow of non-condensable gas therethrough and means for blocking the flow of non-condensable gas through said last-named conduit during on periods of operation of the system and for opening said conduit to flow of non-condensable gas therethrough during off periods of operation, the construction and arrangement being such that during on periods of operation of the system non-condensable gas is withdrawn from the absorber of said system and delivered to said gas trap until a predetermined amount of such gas is accumulated in said trap, after which, any non-condensable gas delivered to said trap beyond the predetermined amount is conveyed therefrom to said purge receiver, and during off periods of operation of said refrigerating system the predetermined amount of non-condensable gas retained in said gas trap is returned to the absorber of said system.

13. In the art of refrigeration through the agency of a two-pressure absorption refrigerating system including a generator, a condenser, an evaporator, an absorber and conduits interconnecting said elements providing main and auxiliary circuits for flow of working media therethrough, that improvement which comprises withdrawing non-condensable gas from a main working media circuit of said system, storing the withdrawn non-condensable gas in an auxiliary working media circuit during on periods of operation of the system, establishing a liquid seal in the auxiliary working media circuit whereby the stored non-condensable gas is retained therein, removing the liquid seal in the auxiliary working media circuit during off periods of operation, and returning the stored non-condensable gas to the main working media circuit during such off periods of operation of the system.

14. In the art of refrigeration through the agency of a two-pressure absorption refrigerating system including a generator, a condenser, a vapor separator, an evaporator, an absorber and conduits interconnecting said elements providing main and auxiliary circuits for flow of working media therethrough, that improvement which comprises withdrawing non-condensable gas from the absorber of said system, storing the withdrawn non-condensable gas in an auxiliary working media circuit during on periods of operation of the system, establishing a liquid seal in the auxiliary working media circuit whereby the stored non-condensable gas is retained therein, removing the liquid seal in the auxiliary working media circuit during off periods of operation, and delivering the stored non-condensable gas to the vapor separator during such off periods of operation of the system.

15. In the art of refrigeration through the agency of a two-pressure absorption refrigerating system including a generator, a condenser, an evaporator, an absorber and conduits interconnecting said elements providing main and auxiliary circuits for flow of working media therethrough, that improvement which comprises withdrawing non-condensable gas from the absorber of said system, storing the withdrawn non-condensable gas in an auxiliary working media circuit during on periods of operation of the system, establishing a liquid seal in the auxiliary working media circuit whereby the stored non-condensable gas is retained therein, removing the liquid seal in the auxiliary working media circuit during off periods of operation, and returning the stored non-condensable gas to the absorber during such off periods of operation of the system.

16. A method of reducing superheat of a refrigerant-absorbent solution in an absorption refrigerating system of the two-pressure type having a generator, a vapor separator, a condenser, an evaporator, an absorber and conduits interconnecting said elements for flow of a refrigerating medium and an absorption solution, which includes accumulating non-condensable gas in the absorber of said system, subjecting the accumulated non-condensable gas to absorption solution in said absorber whereby at least a portion of the accumulated gas is entrained by the absorption solution, flowing the absorption solution and entrained non-condensable gas to the generator of said system wherein the entrained non-condensable gas forms vapor nuclei which promote quiet boiling of the absorption solution, withdrawing any remaining accumulated gas from the absorber of said system, storing a predetermined amount of the withdrawn non-condensable gas during on periods of operation of the system, establishing a barrier to flow of the stored non-condensable gas, exhausting to the atmosphere any excess of withdrawn non-condensable gas beyond the predetermined amount stored, removing the barrier during off periods of operation of the system, and delivering the stored non-condensable gas to the vapor separator during off periods of operation.

17. A method of reducing superheat of a refrigerant-absorbent solution in an absorption refrigerating system of the two-pressure type having a generator, a condenser, an evaporator, an absorber and conduits interconnecting said elements for flow of a refrigerating medium and an absorption solution, which includes accumulating non-condensable gas in the absorber of said system, subjecting the accumulated non-condensable gas to absorption solution in said absorber whereby at least a portion of the accumulated gas is entrained by the absorption solution, flowing the absorption solution and entrained non-condensable gas to the generator of said system wherein the entrained non-condensable gas forms vapor nuclei which promote quiet boiling of the absorption solution, withdrawing any remaining accumulated gas from the absorber of said system, storing a predetermined amount of the withdrawn non-condensable gas during on periods of operation of the system, establishing a barrier to flow of the stored non-condensable gas, exhausting to the atmosphere any excess of withdrawn non-condensable gas beyond the predetermined amount stored, removing the barrier during off periods of operation of the system, and returning the stored non-condensable gas to the absorber during off periods of operation.

EUGENE P. WHITLOW.

No references cited.